(No Model.) 2 Sheets—Sheet 1.
E. W. CLARK.
PROCESS OF AND APPARATUS FOR EXTRACTING ORES BY ELECTROLYSIS.
No. 544,610. Patented Aug. 13, 1895.
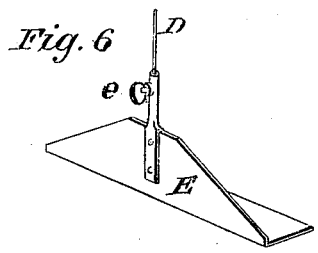
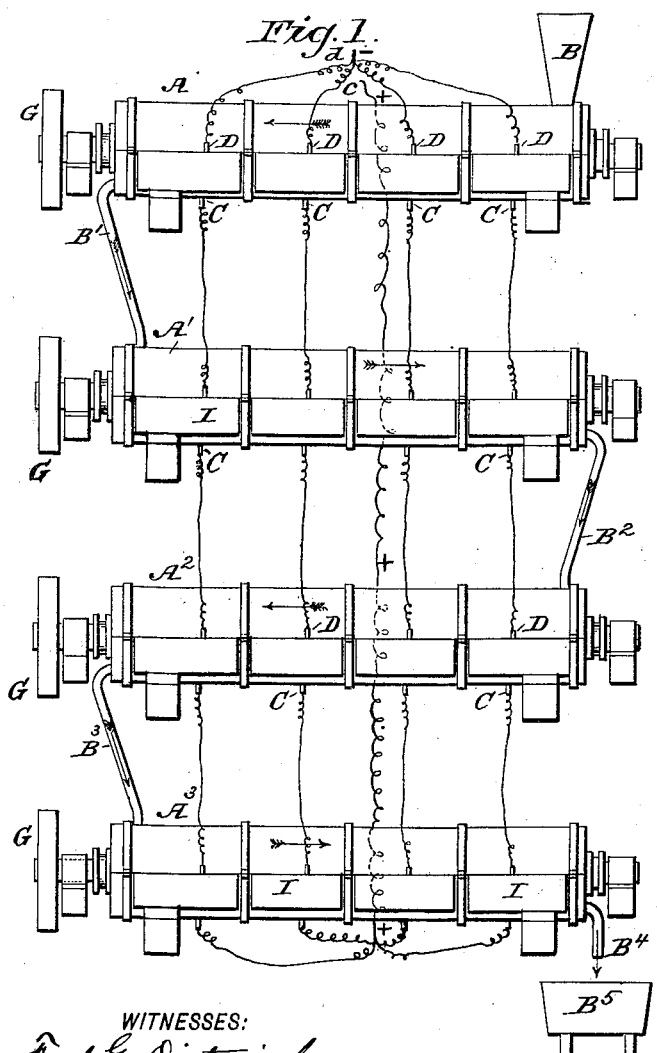
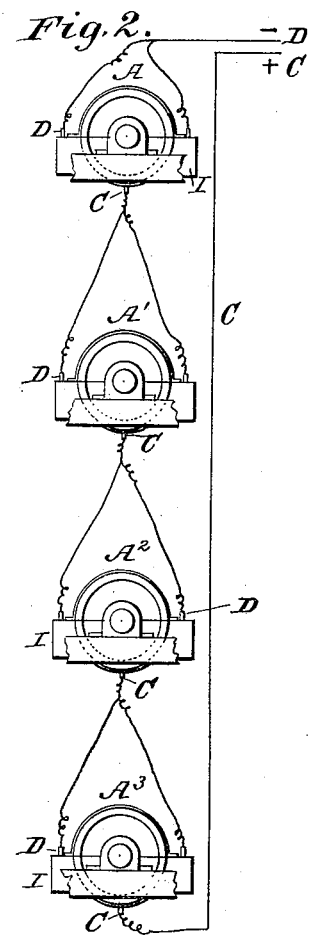
WITNESSES:
Fred G. Dieterich
W. C. Keegin
INVENTOR
Edward W. Clark
BY
Holcomb & Johnston
ATTORNEYS (No Model.) 2 Sheets—Sheet 2.
E. W. CLARK.
PROCESS OF AND APPARATUS FOR EXTRACTING ORES BY ELECTROLYSIS.
No. 544,610. Patented Aug. 13, 1895.
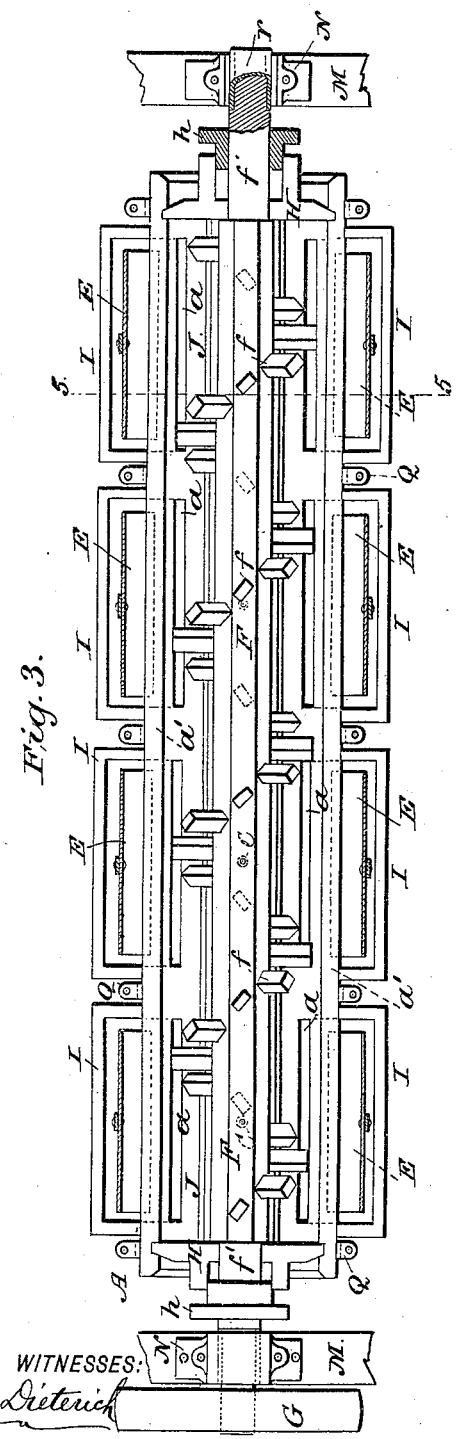
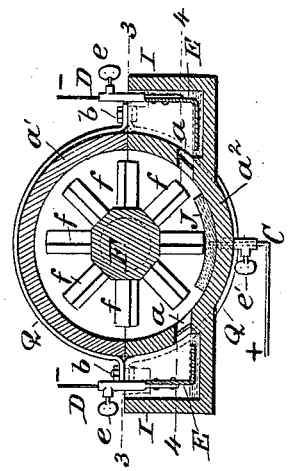
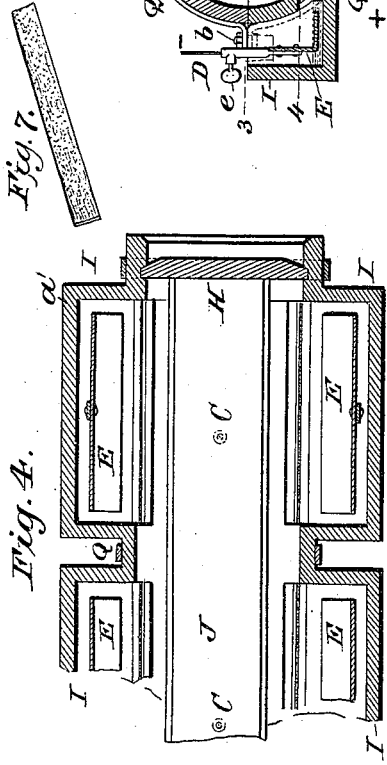
WITNESSES:
Fred G. Dieterich
W. C. Keegin
INVENTOR
Edward W. Clark,
BY
Holcomb & Johnston
ATTORNEYS

UNITED STATES PATENT OFFICE.

EDWARD W. CLARK, OF BUTTE, MONTANA, ASSIGNOR OF TWO-THIRDS TO EDWIN M. CLARK AND THE WESTERN IRON WORKS, OF SAME PLACE.

PROCESS OF AND APPARATUS FOR EXTRACTING ORES BY ELECTROLYSIS.

SPECIFICATION forming part of Letters Patent No. 544,610, dated August 13, 1895.

Application filed November 5, 1894. Serial No. 527,953. (No model.)

*To all whom it may concern:*

Be it known that I, EDWARD W. CLARK, a citizen of the United States, residing at Butte City, in the county of Silver Bow and State of Montana, have invented certain new and useful Improvements in Processes of and Apparatus for Extracting Ores by Electrolysis; and I do hereby declare the following to be a full, clear, and exact description of the invention, such as will enable others skilled in the art to which it appertains to make and use the same.

My invention relates to the electric chlorination and separation of auriferous ores by a new and improved process and apparatus, whereby the result is accomplished in less time and at less expense than by the methods and apparatus heretofore employed. It is a well-known fact that in the reduction of ores containing gold chlorine gas will dissolve the gold in the presence of water, which takes up and holds the gold in solution. It is also well known that by passing an electric current through a solution of chloride of sodium the salt is split up, chlorine and oxygen gas coming off at the positive electrode, while hydrogen gas and sodium are liberated at the negative electrode. If both electrodes are placed in the same chamber containing the ores in a solution of sodium chloride, chlorine, oxygen, and hydrogen gases and sodium hydrate are liberated and confined in the same chamber. The hydrogen combines to a certain extent with the chlorine gas, forming hydrochloric acid, the hydrochloric acid and chlorine combining with sodium hydrate forming sodium chloride. There is, therefore, a considerable loss in chlorine gas.

My invention consists, first, in placing the positive and negative electrodes in separate chambers, one of which is a separating and the other an amalgamating chamber, provided with a channel or passage between them, within which channel is interposed a screen or filter, whereby the chlorine gas is generated in one compartment or chamber and the hydrogen gas and hydrate of soda in another, and kept separate by the aqueous fluid or solution which fills the chambers to a point above the opening or channel and prevents the gases in the separate chambers from intermingling, while the screen or filter permits the electric current and solution to pass freely between the chambers and eliminates and prevents the passage to the amalgamating-chamber of the coarser material contained in the crude ore or pulp in the main chamber, which is in direct contact with the positive electrode; second, an apparatus by which my method is carried into operation and which consists in certain details of construction and arrangement of parts, hereinafter more particularly described in the specification, illustrated in the drawings, and pointed out in the claims.

In the accompanying drawings like letters indicate like parts.

Figure 1 is a side elevation of my improved apparatus. Fig. 2 is an end view thereof. Fig. 3 is a horizontal sectional plan view of one of the cylinders, taken on the line 3 3 of Fig. 5. Fig. 4 is a detail horizontal section on the line 4 4 of Fig. 5. Fig. 5 is a transverse section of one of the cylinders, taken on the line 5 5 of Fig. 3; and Fig. 6 is a detail of one of the cathodes. Fig. 7 is a detail view of the porous diaphragm.

My apparatus consists of a series of cylinders A, A', A², and A³, arranged one above the other upon suitable supports W, composed of any suitable material, and preferably constructed in two parts, an upper and a lower, horizontally united at the center by wrought-iron or steel bands Q, surrounding them and secured by suitable clamping-bolts. They are made to communicate with each other by means of the pipes B' B² B³, arranged alternately at opposite ends. These cylinders are provided with a central circular chamber closed at the ends by the heads H H, into which are fitted glands $h$ $h$, forming stuffing-boxes. Within the circular chamber is a wooden shaft F, of octagonal form, provided with projecting arms or stirrers $f$, which are rectangular in cross-section, and arranged around the shaft F in spiral form, as shown in Fig. 3.

The extremities of the shaft F are reduced and form arbors $f'$, resting in the bearings H $h$ of the stuffing-boxes, and their extreme ends are carried in pillow-blocks N N to prevent wear, which pillow-blocks rest on cross-timbers M M, a metal sleeve $r$ being placed on the ends of the shafts for the purpose of affording a metal wearing-surface in the pillow-blocks. The stuffing-boxes in connection with the heads H and glands h form gas-tight joints at the ends of the cylinders.

On the sides of the cylinders, and usually formed integral with them, are a series of receiving-boxes I I I I, extending longitudinally between the bands Q. These boxes are made to communicate with the interior of the cylinder by longitudinal openings or passages a placed at a point slightly above their bottoms, as shown in Fig. 5.

The floor or bottom of these boxes is covered with mercury to a point level with the lower face of the opening a, and a screen of canvas or other porous material is interposed within the openings between the boxes I and the interior of the cylinder. This screen is of just sufficient porosity to permit of the passage of the current and solution, but of sufficient density to afford some resistance to the pressure of the accumulated gases in the interior of the cylinder.

Upon the bottom of the cylinder and extending throughout its length is an anode J, composed of carbon or other suitable substance, and within the boxes I and suspended within the mercury are cathodes E. Connecting with the anode J is the positive wire C of a dynamo or electric battery, and connecting with the cathodes E is the negative wire D. These wires are secured by suitable thumb-screws e e' projecting within a sleeve adapted to receive the ends of the wires. It will be observed that, in the arrangement of these wires, in my apparatus I connect the positive wire C with the anode of the lowermost cylinder of the series at four points, as shown in Fig. 1. The negative wires D extend from the several cathodes in the boxes I to the anode in the next succeeding cylinder above, as shown in Fig. 2, and finally with the battery or dynamo, thus completing the circuit.

In operating my device the ore is introduced through the hopper B in a powdered form and mixed with a solution of chloride of sodium, forming a pulp of the desired consistency. A current of electricity is then passed through the mass from a dynamo or battery by means of the wires C D, and electrolysis takes place, chlorine and oxygen gas being generated by the positive electrode or anode within the chamber in the cylinder containing the pulp, while hydrogen gas and sodium are liberated in the chambers of the boxes I containing the negative electrode or cathode. These gases, being lighter than the aqueous solution or pulp, rise to its surface in their respective chambers, which surface is higher than the opening or passage between the chambers and are thereby prevented from combining. Hence the chlorine gas coming off from the carbon J in the cylinder beneath the ore, in its nascent state, is preserved from deterioration and loss which would result from its combination with the hydrogen gas and sodium that is liberated in the chambers of the boxes I. The shafts F are revolved by means of suitable power applied to the pulleys G, and the stirrers f thoroughly agitate the pulp, and by reason of their spiral arrangement on the shafts, serve to propel it gradually toward the outer end, where it is discharged through the pipe B' into the next cylinder. Meantime the chloride of gold in solution formed by the electrolysis is forced or finds its way through the screens in the passages a and is gathered by the mercury in the boxes I, and the residuum, after passing through the entire series of cylinders, is discharged through the spout $B^4$ into the tub or receptacle $B^5$. Any gold remaining in solution is drawn off and precipitated in the usual manner.

The amount of chlorine gas generated in each cylinder will be in excess of that required for use. This excess may be utilized by introducing a sufficient quantity only of hydrate of lime, to combine therewith and form hyperchloride of lime, from which the chlorine in its nascent state may be freed in the last cylinder by the addition of sulphuric acid.

It will be observed that by employing a series of separate cathode chambers containing mercury and communicating with a single anode chamber the solution in the anode chamber containing the chloride of gold is subjected to a regular succession of contacts with different cathode or amalgamating chambers during its passage, and by each contact is relieved of some of the remaining gold not taken up in the preceding contact, until by continuing the operation, as herein described, all, or practically all, the gold is extracted from the solution and deposited in the successive cathode or amalgamating chambers. As the amount of gold in solution is greater at the earlier part of the operation the amalgam in the first boxes or chambers will naturally be richest and require removal oftenest, and the amount deposited will decrease with each successive contact, thus producing different grades of amalgam as the operation progresses.

Having thus described my invention, what I claim, and desire to secure by Letters Patent, is—

1. The herein described process of separating gold from its ores, which consists in mixing said ore with a solution of chloride of sodium and then passing said mixture into the presence of separated bodies of mercury in a regular succession, and at the same time subjecting it to the action of electricity, each body of mercury acting as a cathode.

2. The herein described process of separating gold from its ores, which consists in mixing the crushed ore with a solution of chloride of sodium, and then subjecting the mass to successive currents of electricity in the presence of a succession of separated bodies of mercury each body of mercury acting as a cathode, only the liquid portion of the mixture or pulp being permitted to come in contact with the mercury.

3. In an electric chlorinator for auriferous ores, the combination with a horizontally located hollow cylinder having closed ends and adapted to receive the ores and a sodium chloride solution; of an agitator within said cylinder; a series of amalgamating chambers arranged on the exterior sides of the cylinder and communicating with its interior by openings; porous screens or diaphragms within said openings; an anode within said cylinder, and a cathode within each of the amalgamating chambers, substantially as described.

4. In an electric chlorinator for gold ores, the combination of the stationary horizontal cylinder provided with an interior chamber to receive the ore and a sodium chloride solution; a stirrer-shaft provided with a series of spirally arranged stirrer arms and adapted to revolve in the cylinder chamber; a series of boxes arranged along the exterior sides of the cylinder and communicating with its interior by passages or openings; a porous diaphragm interposed within said openings; an anode within the cylinder chamber; and cathodes within the exterior chambers, substantially as described.

5. In an electric chlorinating device for gold ores, the combination of the hollow cylinder adapted to receive the ores and a sodium chloride solution; an agitator therein; a series of separate boxes arranged along the exterior sides of the cylinder and communicating with its interior by openings or passages, porous diaphragms interposed within said passages, a positive electrode within the chamber containing the chloride solution and ores, and negative electrodes within the amalgamating chambers, all arranged substantially as and for the purpose described.

6. In an electric chlorinator for gold ores, the combination with the chambered cylinder described, and the series of boxes arranged along its sides and communicating with its interior by openings or passages; of the screen or filter interposed within said openings or passages, an anode within the cylinder chamber, and cathodes within the amalgamating chambers, substantially as and for the purpose described.

7. In an electric chlorinating apparatus for gold ores, the combination with two or more horizontally arranged cylinders constructed as described, and provided with anodes, and the series of separate amalgamating compartments communicating with their interiors and provided with cathodes, of the connecting pipes whereby the ore pulp to be treated is conducted successively into and through the several cylinders, substantially as and for the purpose described.

8. In an electric chlorinator for gold ores, the combination of the hollow cylinder constructed in longitudinal sections united by bands, and having the series of separate boxes or chambers communicating with its interior; the electrical connections consisting of the anode in the cylinder chamber, and the cathodes in the boxes or amalgamating chambers, the agitator shaft provided with the spirally arranged series of stirrer arms and adapted to revolve in the cylinder chamber, and the stuffing boxes at the ends of the cylinder, all arranged substantially as and for the purpose described.

In testimony whereof I affix my signature in presence of two witnesses.

EDWARD W. CLARK.

Witnesses:
JOHN LAWRENCE,
VICTOR H. STRASBURGER.